Patented July 16, 1929.

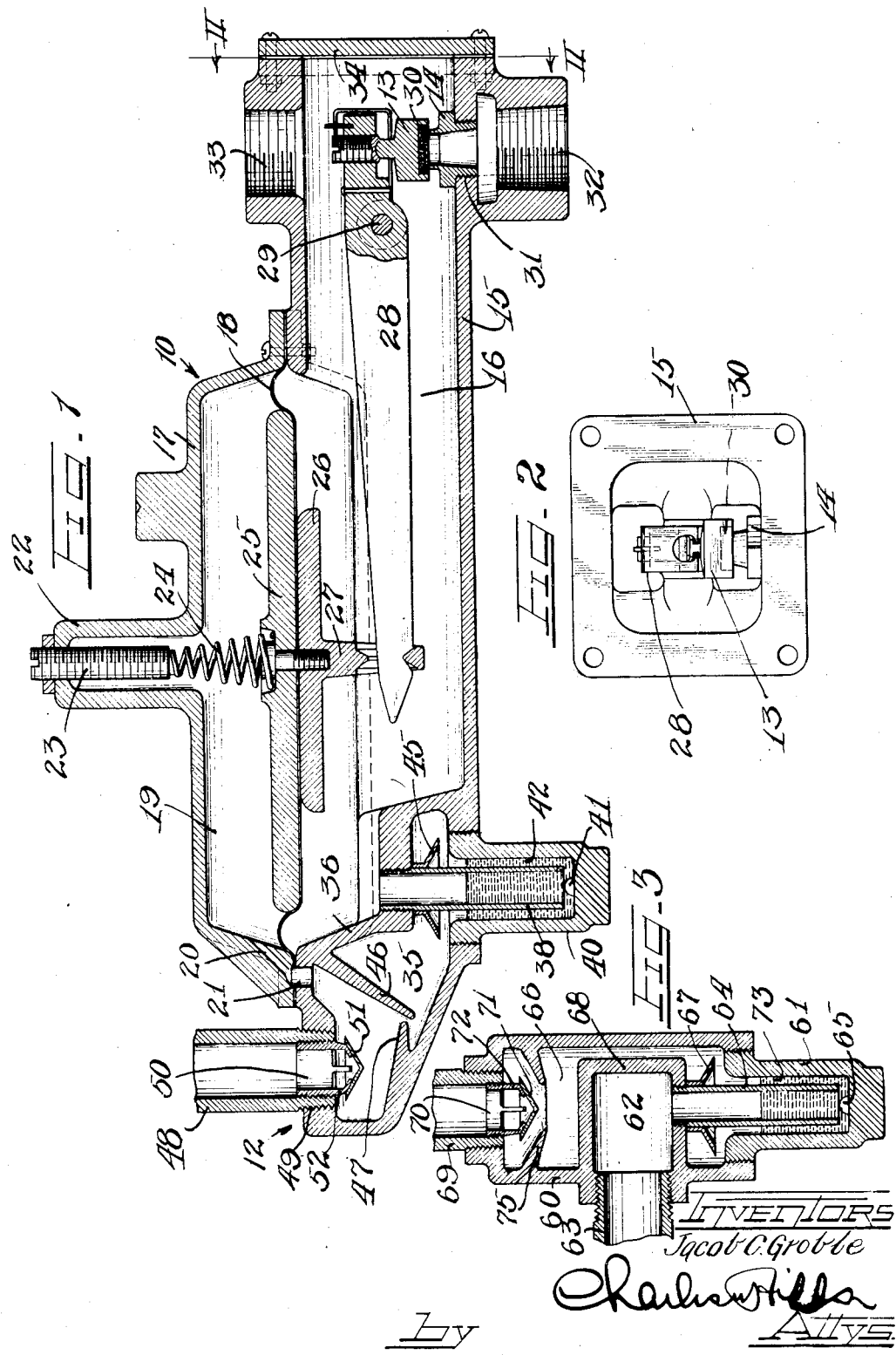

1,720,673

UNITED STATES PATENT OFFICE.

JACOB C. GROBLE, OF ANDERSON, INDIANA, ASSIGNOR TO GROBLE GAS REGULATOR COMPANY, OF ANDERSON, INDIANA, A CORPORATION OF INDIANA.

SEAL FOR PRESSURE REGULATORS.

Application filed February 1, 1928. Serial No. 251,018.

The present invention relates to a liquid seal construction, and more particularly to a liquid seal especially adapted for use in connection with pressure regulators.

It is customary to employ a liquid seal in connection with the conventional pressure regulator adapted to permit of the escape of fluid or gas when the pressure of the same exceeds a predetermined point should the valve of the regulator become stuck or fail to operate promptly. In other words, it is standard practice to employ a liquid seal in connection with the pressure regulator and adapted to afford an exit to fluid or gas of excessive pressure which might accumulate in the regulator housing due to the valve failing to seat promptly and properly.

Now I have found that although the conventional liquid seal construction operates satisfactorily under normal conditions, still in the event that the regulator diaphragm should be suddenly subjected to an abnormally high pressure it will result in the liquid of the seal being displaced with such rapidity and force that quite frequently some of the liquid escapes through the vent for the gas of excessive pressure associated therewith. Obviously if the column of liquid comprising the seal is lessened, it means that it will respond to a much less pressure than that which it was set to normally operate and hence will function to allow gas to escape from the regulator even though the gas is not of an excessive pressure.

It is, therefore, the principal object of the present invention to provide a liquid seal construction including means for preventing the loss of any of the liquid column comprising the seal, so that its sensitivity to pressure will not be impaired.

Another object of my invention resides in the provision of a liquid seal construction especially adapted for use in connection with the pressure regulator and including means adapted to augment the return of the liquid to column form after each time some of the liquid has been displaced by an excessive pressure to relieve the pressure prevailing in the regulator.

Still a further object of the invention is the provision of a liquid seal construction including means for holding a column of liquid, and slanting baffle means for causing the liquid to be returned to its column form after each displacement of the liquid by a gas, whereby said column of liquid will not be displaced by gas pressures below a predetermined point.

Other objects and advantages of my invention will more fully appear from the following detailed description taken in connection with the accompanying drawing which illustrates a single embodiment thereof and in which:

Figure 1 is a fragmentary vertical sectional view taken through a pressure regulator including a liquid seal construction embodying the features of the present invention;

Figure 2 is an end view taken on the line II—II of Figure 1 looking in the direction indicated by the arrows, and Figure 3 is a fragmentary vertical sectional view of a modified liquid seal construction.

In the drawings:

Like reference characters designate similar parts throughout the several views. The reference character 10 designates generally a gas pressure regulator of substantially the same construction as that of the regulator disclosed in my Patent No. 1,588,411, issued January 15th, 1926, but differing from my patented regulator in that it includes a liquid seal safety device designated generally by the reference character 12 disposed in communication with the pressure chamber of the regulator and adapted to relieve the diaphragm of gas pressures exceeding a predetermined value in the event that the valve 13 of the regulator fails to seat properly on the associated valve seat 14.

The regulator 10 includes a main housing member 15 defining the gas chamber 16 and an auxiliary housing or cap member 17 adapted to secure a diaphragm 18 to the wall of member 15. The cap member 17 defines an air chamber 19 above the diaphragm 18, which chamber is disposed in communication with the upper end of a diagonal air passageway 20, the lower end of which terminates in communication with a vertical opening 21 formed in the housing member 15. The cap member 17 includes a tubular boss 22 into which is threaded an adjustable screw 23, the lower end of which abuts at the upper end of a conical spring 24 which has its other end resting on pressure plate 25 connected to diaphragm 18.

Secured to the under side of the diaphragm 18 is a plate 26 including an apertured central projection 27 cooperable with an end of lever 28 pivotally mounted upon a pin 29 connected to the housing 15. The other end of lever 28 carries valve member 13 which includes a valve leather insert 30 adapted to cooperate with the upper end of the tubular valve seat 14 which is threaded into opening 31 in the housing member 15. Access to the valve member 13 for purposes of adjustment may be had by removing the end plate 34 secured to the housing member 15.

The opening 31 is disposed in communication with the inlet 32 of the regulator. Positioned directly above the inlet 32 and directly over the valve member 13 is the pressure regulator outlet 33. The operation of this regulator of my construction is thought to be obvious.

It will, of course, be apparent that the diaphragm 18 causes valve 13 to become unseated when the gas pressure prevailing in chamber 16 falls below a predetermined point. This means that the valve member will be successively seated and unseated so as to maintain a substantially constant gas pressure in the chamber 16. As previously pointed out, quite frequently foreign matter gets between the leather insert 30 of valve member 13 and the valve seat 14, thus preventing the valve member from properly seating on the valve seat and thereby allowing an excessive gas pressure to accumulate in chamber 16. In order to relieve the diaphragm 18 of this excessive pressure, I provide the liquid seal construction 12 which I shall now proceed to describe in detail.

The housing member 15 also serves to define a chamber 35 which is separated from the pressure chamber 16 by means of a partition wall 36. The wall 36 has threaded into it the upper end of a mercury seal tube 38, the lower end of which extends into a mercury cup 40 threaded into the wall of housing member 15. It will be noted that the bottom of the cup 40 is spaced a slight distance from the lower end of the tube 38 and that the bottom of the cup 40 is provided with a protuberance 41 disposed in axial alignment with the tube 38. This protuberance 41 is disposed in the space between the end of the tube and the bottom of the cup and is so arranged that mercury will be allowed to freely enter the tube 38. Disposed in the cup 40 is a body of mercury designated generally by the reference character 42.

Secured to the outer surface of the tube 38 and positioned above the cup 40 in chamber 35 is an annular conical baffle member 45 adapted to augment the return of the mercury 42 to the cup member 40 each time it is displaced by the escape of gas from the chamber 16 due to an excessive pressure.

Formed integral with wall 36 is a downwardly extending slanting flange or baffle element 46, the lower end of which terminates adjacent a baffle element 47 disposed at a slight angle to the horizontal. These two baffle elements 46 and 47 are adapted to cooperate to prevent mercury blown from the cup 40 by an excessive gas pressure from reaching the vent pipe designated by the reference character 48. The lower end of this pipe 48 is threaded into an opening 49 in the housing member 15 disposed in communication with the chamber 35 above the baffle elements 46 and 47. Threaded into the lower end of pipe 48 is a tubular baffle element 50 having its lower end provided with a conical head 51 connected to the element 50 by spaced legs 52. This conical element 51 serves to prevent liquid blown into the vent pipe 48 from the cup 40 by an excessive gas pressure from escaping into the atmosphere through the vent pipe 48 but at the same time allows atmospheric air to enter the chamber 35. This air, as will be evident from the drawing, serves to return the liquid to the cup 40 and also serves to act upon diaphragm 18 through the opening 21 and the passageway 20 previously described. It will be, of course, evident that opening 21 is disposed in communication with chamber 35.

The operation of the liquid seal construction of my invention is briefly as follows:

The column of mercury 42 in cup 40 is of such a height that it will not be displaced by the normal or predetermined gas pressure prevailing in chamber 16. However, in the event that an excessive gas pressure should accumulate in the chamber 16, gas will enter the tube 38 and will displace some of the column of liquid by blowing it upwardly into chamber 35. In other words, some of the gas of excessive pressure will escape through the mercury into chamber 35 and out into the atmosphere through the vent pipe 48, thus relieving the diaphragm 18 of excessive pressure. The mercury is prevented from being carried out by the gas by the baffle elements 46 and 47 which are so inclined as to augment the gravitation of the mercury back into the cup 40 so as to restore the column of liquid in a minimum of time. The annular baffle 45 also serves to resist the upward rush of the mercury when the gas of excessive pressure is escaping therethrough. In the event that some mercury should get by the baffle elements 46 and 47, it will come into contact with the surface of the conical baffle element 51 which will prevent it from entering the vent pipe 48. Obviously the moving particles of mercury upon striking the conical baffle element 51 will lose their force and gravitate onto the slanting baffle elements 46 and 47 which will conduct this mercury downwardly so as to allow it to gravitate back into the cup 40. It will thus be evident that the annular baffle 45, the baffle elements 46 and 47, and the conical baffle 51 all serve to prevent any of the particles of mercury from escaping into the atmosphere after each displacement of mercury by a gas of excessive pressure. This means that a column of mercury of substantially constant height will be maintained in cup 40 and thereby insures that the mercury seal will not be displaced by a gas pressure below the predetermined pressure to which the regulator is adjusted to accommodate.

In Figure 3 I have illustrated a liquid seal device embodying the features of my invention which is adapted to be connected to the housing of the conventional pressure regulator now in use without any radical changes in the construction of such regulators. The device includes a housing 60 having threaded in its lower end a cup-like member 61 adapted to hold a column of mercury or other suitable liquid 73. Formed integral with the housing 60 and disposed in the interior thereof is a wall 68 which defines a chamber 62 having threaded therein a pipe 63. This pipe 63 may be connected in any suitable manner to the gas pressure chamber of a pressure regulator. Also it is, of course, evident that the pipe 63 may be connected to any gas line in which it is desired to maintain a predetermined gas pressure. Threaded into the wall 68 is a downwardly extending tube 64, the lower end of which terminates adjacent to but spaced from the bottom of the mercury cup 61. Positioned in the space separating the lower end of tube 64 and mercury cup 61 is a protuberance 65 located in axial alignment with the axis of the tube. This protuberance 65 is so arranged as to allow liquid to freely enter and leave tube 64.

Secured to the upper end of tube 64 and positioned in the chamber 66 defined by housing 60 is a slanting annular baffle ring 67 adapted to resist upward movement of the mercury from the cup when the same is blown upwardly by a gas of excessive pressure entering the tube 64 from chamber 62. It will be evident that the chamber 66 is positioned around the wall 68 and has no direct communication with chamber 62 except through tube 64.

The upper end of the housing 60 has threaded into it a vent pipe 69 in the lower end of which is threaded a tubular baffle element 70 provided at its lower end with a conical baffle 71. This conical baffle 71 is connected to the tube 70 by means of spaced legs 72, whereby gas can freely escape from chamber 66 into vent pipe 69.

Formed integral with the wall of housing 60 and extending into chamber 66 is an annular or ring-like downwardly slanting flange 75 which constitutes a downwardly slanting baffle disposed at a slight angle to the horizontal and adapted to resist upward movement of particles of mercury.

Now it will be evident that any particles of mercury forced into the upper part of the chamber 66 will lose their force upon striking the downwardly slanting annular baffle 75. Also any particles of mercury striking the conical baffle 71 will also lose their force and gravitate back into the mercury cup 61. Attention is directed to the fact, however, that annular baffle 75 is spaced from the conical baffle 71 so as not to interfere with the escape of gas from chamber 66 into vent pipe 69.

Now, of course, it is to be understood that although I have illustrated and described in detail the preferred form of my invention, the invention is not to be thus limited, but only in so far as defined by the scope and spirit of the appended claims.

I claim as my invention:

1. In combination, a liquid seal construction, a housing including a holder for a column of liquid, a tube extending into said column of liquid, having one of its ends disposed in communication with a gas, a column of liquid in said holder and enveloping the other end of said tube, a conical baffle member mounted on said tube above said column of liquid, said housing including a chamber disposed in communication with said liquid, a vent connected to said chamber adapted to permit gas blown through said column of liquid to escape into the atmosphere, and a downwardly slanting baffle disposed below said vent in said chamber adapted to prevent particles of liquid from being blown out with the gas into said vent.

2. In combination, in a liquid seal construction, a housing including a holder for a column of liquid, a tube extending into said column of liquid, having one of its ends disposed in communication with a gas, a column of liquid in said holder and enveloping the other end of said tube, an annular baffle connected to said tube above said column of liquid, said housing including a chamber disposed in communication with said liquid, a vent connected to said chamber adapted to permit gas blown through said column of liquid to escape into the atmosphere, and a baffle disposed below said vent in said chamber adapted to prevent particles of liquid from being blown out with the gas into said vent, said last mentioned baffle comprising a tubular member extending into said vent and having its end inside of said chamber provided with a conical head.

3. In combination, a liquid seal construction, a housing including a holder for a column of liquid, a tube extending into said column of liquid having one of its ends disposed in communication with a gas, a column of liquid in said holder and enveloping the other end of said tube, an annular baffle connected to said tube above said column of liquid, said housing including a chamber disposed in communication with said liquid, a vent connected to said chamber adapted to permit gas blown through said column of liquid to escape into the atmosphere, a baffle disposed below said vent in said chamber adapted to prevent particles of liquid from being blown out with the gas into said vent, said baffle comprising a conical element mounted at and spaced from said vent, and slanting baffle means connected to said housing and extending into said chamber between said conical baffle and said annular baffle.

4. In a pressure regulator of the class described, a housing, a diaphragm in said housing, said housing having a gas chamber below said diaphragm, a valve in said chamber controlled by said diaphragm for controlling the flow of fluid into said chamber, said housing having connected thereto a holder for a column of liquid, a tube extending into said column of liquid having one of its ends disposed in communication with said chamber, a column of liquid in said holder and enveloping the other end of said tube, said column of liquid being arranged so as to relieve said chamber of gas when the pressure exceeds a predetermined amount, a vent connected to said housing and disposed in communication with said holder of liquid adapted to permit gas blown through the column of liquid to escape from the housing, and a baffle means disposed between said vent and said column of liquid adapted to prevent particles of liquid from being blown out of the housing with the gas entering the vent, said baffle means including an annular slanting baffle secured to said tube above said column of liquid and slanting baffle plates connected to said housing below said vent.

5. In a sealing device for use in connection with a gas pressure regulator, a housing including a holder for a column of liquid, a tube extending into said column of liquid having one of its ends arranged for communication with a chamber of the pressure regulator, a column of liquid in said holder and enveloping the other end of said tube, said column of liquid being arranged so as to relieve said chamber of gas when the pressure exceeds a predetermined amount, a vent connected to said housing and disposed in communication with said holder of liquid adapted to permit gas blown through the column of liquid to escape from the housing, and baffle means disposed between said vent and said column of liquid adapted to prevent particles of liquid from being blown out of the holder with the gas entering the vent, said baffle means including a tubular member extending into said vent and having its end inside of the housing provided with a downwardly convex conical head adapted to be engaged by particles of liquid to prevent their entry into the vent.

In testimony whereof I have hereunto subscribed my name at Anderson, Indiana, county of Madison.

JACOB C. GROBLE.